April 12, 1955     S. J. HEIMAN     2,705,911
REVERSIBLY DRIVEN VENTILATING FAN
Filed Dec. 21, 1953
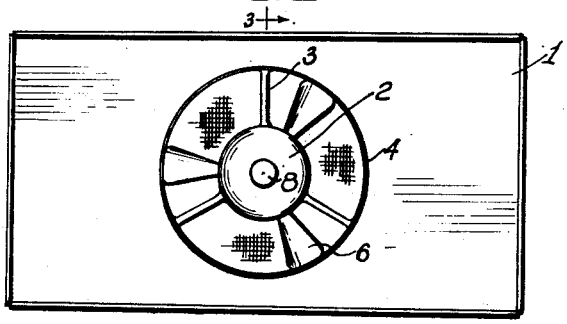
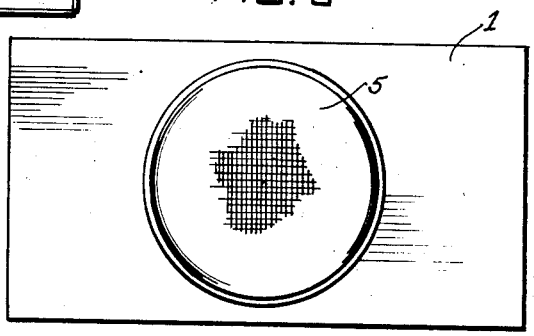
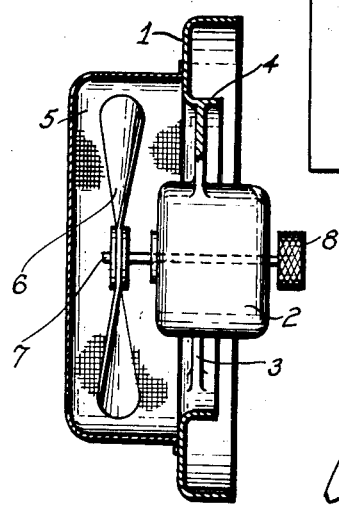
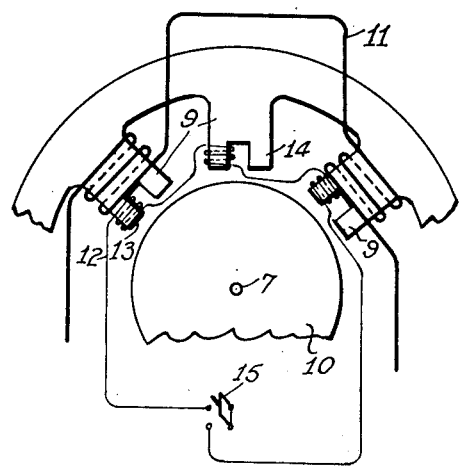
INVENTOR
SIDNEY J. HEIMAN
By: Ben V. Zillman
ATTORNEY

United States Patent Office 2,705,911
Patented Apr. 12, 1955

2,705,911

REVERSIBLY DRIVEN VENTILATING FAN

Sidney J. Heiman, St. Louis, Mo.

Application December 21, 1953, Serial No. 399,399

1 Claim. (Cl. 98—94)

This invention relates to ventilating fans of the type adapted to be used to move comparatively small volumes of air in homes, small offices and the like, and has among its objects the construction of such a fan that may be mounted in a suitable wall opening, as for instance the window opening of such home or office, will be neat and compact in its construction, easy to install, and exceptionally economical to manufacture, and be otherwise satisfactory and efficient for use wherever deemed applicable.

One of the principal objects of my invention is so constructing such a mechanism that the electric motor forming an integral part thereof will have a starting winding sufficient to commence the drive of the motor in a given direction, yet when said motor is manually started in the reverse rotational direction at the commencement of energizing of the motor, said inherent direction of rotational drive will be overcome and the motor will continue to drive in said reversed direction.

Another object of the invention is to so construct said motor that it will have an auxiliary starting winding as a part thereof, in addition to the primary winding, and in which said auxiliary winding is so weak that although it is sufficient to tend to start the motor driving in a given direction, this inherent driving may be overcome by manually actuating the motor shaft in the reverse direction at the commencement of energizing of said motor, whereupon said motor will continue to drive in said last-mentioned direction.

Many other objects and advantages of the construction herein shown and described will be obvious to those skilled in the art to which this invention appertains and as will be more clearly set forth in the description.

In the drawings, wherein like reference characters represent like or corresponding parts throughout the views, Figure 1 is a front elevation illustrating the device;

Figure 2 is a rear elevation of the same;

Figure 3 is a vertical cross-sectional view of the same, taken substantially along the line 3—3 of Fig. 1; and Figure 4 is a diagrammatic view of the motor with a portion of its windings.

Referring more particularly to the drawings, wherein I have illustrated a preferred embodiment of my invention, there is shown a device adapted to be inserted into a suitable wall opening, such as a window opening, of a room, for moving the air either into the room or exhausting the air from the latter.

Said device may have the carrying frame or panel 1, of a size to fit into said window opening, and is preferably fastened in place within the latter, as for instance to the sashwork of the window, said panel usually extending vertically within said opening, and in most instances being made of sheet metal of the desired rigidity and strength.

A motor 2 is mounted to said panel to be an immovable and integral part of the latter, as by the arms 3 connecting said motor to the bounding flange 4 of the opening through the panel and through which air is directed into or out of the room.

If desired, a guard screen 5 may be secured to one face of the panel and forming a chamber in which the fan 6 operates.

The fan has a drive shaft 7, that in the form illustrated, is a continuation of the drive shaft of the motor, and the other end of said shaft has an extension that projects outwardly beyond the motor so that it may be grasped for manual rotational actuation, and further may be provided with an enlarged knob 8 thereat for such grasping, for a purpose to be hereinafter set forth.

As there are times when it is desired to draw fresh air into a room, as well as to exhaust air therefrom, I have so constructed my motor that it may drive the fan in either direction of rotation. Of course, reversibly driven fans are old in the art, but they are relatively costly to construct inasmuch as they require a separate starting winding for each of the directions of rotation of the motor.

In order to minimize the cost therefore, and yet obtain a resultant motor that may be selectively rotated to drive in either direction, I employ but a single starter winding that will start the rotation of the motor in a given direction, but wherein said tendency to rotate in said given direction can be easily and conveniently overcome to start the drive of the motor in the reverse direction, said starter winding being quite weak so as to readily permit of a positive change of drive by manual means, as will now be explained.

The motor being illustrated may be of the induction type of alternating current motor, having the circumferentially spaced polar elements 9 projecting inwardly of the stator portion, and these polar elements may be split if desired and as indicated, and the usual rotor element 10 is shown as being mounted on the drive shaft 7 previously mentioned.

The motor has a main or primary winding 11 connected in series about alternately spaced polar elements 9 and said winding is adapted to be connected by suitable leads to some source of electrical current supply, this arrangement resulting in that consequent poles are produced on the unwound polar projections with a polarity opposite from that of the poles that are wound.

The pair of radially innermost portions of each of said poles are indicated at 13—14, one to each side of the slot or split of said poles, and about one of each of said pair of radially innermost polar portions, say, the portion 13, I wind the auxiliary or starter windings 12, said windings being in series about the correspondingly positioned portions 13, 13. A switch 15 may control the flow of electrical current through the winding 12, and is shown as separate from and independent of the switch (not shown) for opening and closing the circuit through the main winding 11. However, it is obvious that both circuits may be energized at the same time, through combining the two switches into a single operating unit in any desired manner.

Now, when starting the motor, the starter winding would always start rotation of the latter in the same given direction. Therefore, I have so modified the auxiliary or starter winding so as to make it relatively weak in its shaft turning effect, so that even though said winding is energized, its effect may be overcome by manually rotating the motor shaft in the direction reverse to the directional tendency of said winding force, whereafter the motor will continue to rotate in the reversed direction until the operating current for the motor is shut off.

In order to facilitate such manual operation of the motor shaft at the beginning of fan operation, the knob 8, which has been enlarged for the purpose, may be grasped and thus be turned in the opposite direction to that in which the shaft would ordinarily be started.

By constructing a fan assembly in the manner just described, the entire device may be placed in the window opening and left in fixed position, and yet permit of the fan being operated to turn to draw air either into or out of the room, without any bodily moving of the fan or of all or a portion of the supporting panel.

Having thus described my invention, it is obvious that various immaterial modifications may be made in the same without departing from the spirit of the invention; hence I do not wish to be understood as limiting myself to the exact form, arrangement, construction and combination of the parts herein shown and described, or the uses mentioned, except as limited by the art to which this invention applies or by the claim hereunto appended.

I claim:

A window ventilator and exhaust fan comprising an electric motor having a drive shaft extending therethrough and projecting from both ends thereof; a fan on one end of the shaft; a rotor mounted on the shaft intermediate its ends; a stator; circumferentially spaced polar elements disposed around the rotor and projecting inwardly from the stator toward the rotor; a primary winding wound around alternate ones of the polar elements; a continuous starter winding wound in series around all of the polar elements and adapted to carry a weaker current than the primary winding, whereby when energy is applied to the starter winding to start the motor in one direction, the direction of rotation of the motor may be reversed by manually turning the free end of the shaft in a direction opposing the force applied to the rotor by the starter winding.

References Cited in the file of this patent

UNITED STATES PATENTS

| | | |
|---|---|---|
| 661,464 | Aldrich et al. | Nov. 6, 1900 |
| 695,938 | Lamme | Mar. 25, 1902 |
| 1,917,327 | Preston | July 11, 1933 |
| 1,969,981 | Janca | Aug. 14, 1934 |
| 2,230,612 | Crise et al. | Feb. 4, 1941 |
| 2,456,340 | Tideman | Dec. 14, 1948 |
| 2,476,692 | Bernstein | July 19, 1949 |